US012652697B2

(12) United States Patent
Hedayat et al.

(10) Patent No.: US 12,652,697 B2
(45) Date of Patent: Jun. 9, 2026

(54) FRAME-BASED CHANNEL ACCESS TECHNIQUE

(71) Applicant: Apple Inc., Cupertino, CA (US)

(72) Inventors: Ahmad Reza Hedayat, Carlsbad, CA (US); Lochan Verma, Danville, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 18/471,601

(22) Filed: Sep. 21, 2023

(65) Prior Publication Data

US 2024/0107580 A1 Mar. 28, 2024

Related U.S. Application Data

(60) Provisional application No. 63/409,098, filed on Sep. 22, 2022.

(51) Int. Cl.
*H04W 74/0808* (2024.01)
(52) U.S. Cl.
CPC .............................. *H04W 74/0808* (2013.01)
(58) Field of Classification Search
CPC ........................... H04W 74/0808; H04W 84/12
See application file for complete search history.

(56) References Cited

U.S. PATENT DOCUMENTS 12,075,491 B2 * 8/2024 Oh ...................... H04W 74/085
2019/0007180 A1 1/2019 Shi

2020/0037354 A1 * 1/2020 Li ...................... H04W 74/0808
2021/0385863 A1 * 12/2021 Fan ................... H04W 74/0841
2022/0150757 A1 * 5/2022 Zhang ............... H04W 28/0864
2022/0295575 A1 9/2022 Sun
2022/0377790 A1 * 11/2022 Awadin .............. H04W 74/006

(Continued)

FOREIGN PATENT DOCUMENTS

EP 4042814 B1 * 8/2024 ........ H04W 74/0808
WO 2019213383 11/2019
WO 202345405 3/2023

OTHER PUBLICATIONS

Analytical Evaluation and Potentials of Frame Based Equipment for LTE-LAA/Wi-Fi Coexistence—2019 (Year: 2019).*

(Continued)

*Primary Examiner* — Nizar N Sivji
(74) *Attorney, Agent, or Firm* — Kowert, Hood, Munyon, Rankin & Goetzel, P.C.

(57) ABSTRACT

An electronic device (such as an access point) that provides a frame is described. This electronic device includes: an antenna node communicatively coupled to an antenna; and an interface circuit, communicatively coupled to the antenna node, that communicates with a second electronic device. During operation, the interface circuit may provide, addressed to the second electronic device, the frame that includes an indication that the electronic device uses a frame-based equipment (FBE) channel access technique and attributes of the FBE channel access technique. The attributes may include: a duration of the FBE channel access technique, and a fixed frame period (FFP) for communication during the FBE channel access technique. Moreover, the frame may be compatible with an Institute of Electrical and Electronics Engineers (IEEE) 802.11 standard.

20 Claims, 14 Drawing Sheets

300

PROVIDE A FRAME — 310

PERFORM A CCA — 312

PERFORM ONE OR MORE ADDITIONAL OPERATIONS — 314

(56) References Cited

U.S. PATENT DOCUMENTS

| | | | |
|---|---|---|---|
| 2023/0032015 A1* | 2/2023 | Xu ................... | H04W 74/0808 |
| 2023/0064829 A1* | 3/2023 | Yang ................... | H04W 72/23 |
| 2023/0189338 A1 | 6/2023 | Singh | |
| 2023/0284261 A1* | 9/2023 | Xu ..................... | H04W 74/006 |
| | | | 370/328 |
| 2023/0422298 A1 | 12/2023 | Myung | |
| 2024/0098781 A1* | 3/2024 | Tsai ................. | H04W 74/0808 |
| 2024/0292460 A1* | 8/2024 | Calcev ............. | H04W 74/0808 |
| 2024/0314835 A1* | 9/2024 | Tooher ................. | H04W 72/23 |
| 2024/0334489 A1* | 10/2024 | Kusashima ....... | H04W 74/0808 |

OTHER PUBLICATIONS

Frame based equipment channel access enhancements in NR unlicensed spectrum for the URLLC transmissions—2021 (Year: 2021).*
Wijesiri et al. "Frame based equipment medium access in LTE-U: Mechanism enhancements and DTMC Modeling"; Jan. 5, 2024.
Office Action for U.S. Appl. No. 18/471,755; Sep. 11, 2025.

* cited by examiner

FRAME-BASED CHANNEL ACCESS TECHNIQUE

CROSS-REFERENCE TO RELATED APPLICATION

This application claims the benefit of U.S. Provisional Application No. 63/409,098, entitled "Frame-Based Channel Access Technique," by Ahmad Reza Hedayat, et al., filed Sep. 22, 2022, the contents of which are hereby incorporated by reference.

FIELD

The described embodiments relate, generally, to wireless communications among electronic devices, including techniques for selective use of a frame-based-equipment (FBE) channel access technique.

BACKGROUND

Many electronic devices communicate with each other using wireless local area networks (WLANs), such as those based on a communication protocol that is compatible with an Institute of Electrical and Electronics Engineers (IEEE) 802.11 standard (which is sometimes referred to as 'Wi-Fi'). This communication may include accessing a shared channel.

Next-generation Wi-Fi may need to be capable of handling low-latency applications, such as augmented and virtual reality (AR, VR or XR). However, existing IEEE 802.11 channel access techniques, such as enhanced distributed channel access or EDCA (which is sometimes referred to as 'listen before talk' and may involve use of a clear channel assessment or CCA), typically has random and potentially long channel access delay. Notably, a given access point (which is sometimes referred to as a 'transmitting electronic device') or station (which is sometimes referred to as a 'client', a 'recipient' or a 'recipient electronic device') may perform a random backoff (from a contention window or CW) based at least in part on the access category or traffic priority. For example, when a transmission fails, the contention window may be doubled, causing more random transmission delay. Moreover, regardless of the number of contending stations, a given station or access point may have to wait and refrain from transmission, even when the channel is idle. Therefore, the more stations in a basic service set (BSS), the more idle time with no transmission, which increases the channel waste and access delay.

Note that enhancements that reduce backoff per station (e.g., downlink or uplink orthogonal frequency division multiple access or OFDMA) indicate that a centralized scheduler (e.g., in access points) is often more efficient. However, a channel availability criterion (such as a clear channel assessment or CCA) usually adds to the channel access delay. For example, a channel access criterion for the primary channel may be available when a network allocation vector (NAV) is zero and the CCA passes (e.g., preamble-detect less than threshold 1 or energy-detect less than –62 dBm). Moreover, a channel access criterion for secondary channels may be available when CCA passes (packet detect less than threshold 2 or energy-detect less than –62 dBm) for a point coordination function (PCF) interframe space (PIFS) duration. Nonetheless, observing the NAV typically adds to the overall wait time and, thus, the channel access waste.

SUMMARY

In a first group of embodiments, an electronic device that provides a frame is described. This electronic device includes: an antenna node communicatively coupled to an antenna; and an interface circuit, communicatively coupled to the antenna node, that communicates with a second electronic device. During operation, the interface circuit provides, addressed to the second electronic device, the frame that includes an indication that the electronic device uses an FBE channel access technique and attributes of the FBE channel access technique. The attributes include: a duration of the FBE channel access technique, and a fixed frame period (FFP) for communication during the FBE channel access technique. Moreover, the frame is compatible with an IEEE 802.11 standard.

Note that the interface circuit may dynamically provide the frame based at least in part on a criterion associated with a type of traffic. For example, the criterion may include a latency requirement that is less than a threshold or a quality of service (QoS) that is greater than a second threshold.

Moreover, the frame may include a beacon frame or another type of management frame.

Furthermore, during an instance of the FFP, the interface circuit may perform a CCA for a time interval. When the CCA is successful, the interface circuit may transmit a second frame addressed to the second electronic device during a remainder of the instance of the FFP. Additionally, after transmitting the second frame, the interface circuit may receive, associated with the second electronic device, an acknowledgment or a block acknowledgement during the remainder of the instance of the FFP. Note that transmitting the second frame may include transmitting multiple second frames separated by at least an interframe space.

In some embodiments, when the CCA is successful, the interface circuit may: transmit a trigger frame addressed to the second electronic device during a remainder of the instance of the FFP; and receive, after the trigger frame and associated with the second electronic device, a second frame during the remainder of the instance of the FFP.

Alternatively, when the CCA is not successful, the interface circuit may not transmit a second frame addressed to the second electronic device during a remainder of the instance of the FFP.

Additionally, when the CCA is successful, the interface circuit may transmit a beacon frame during an instance of the FFP that indicates one or more intended recipients of one or more subsequent second frames to be transmitted during the instance of the FFP and the one or more intended recipients include the second electronic device.

Note that the CCA may be performed in channels in a band of frequencies during an instance of the FFP and the interface circuit may communicate multiple second frames with the second electronic device using at least a subset of the channels where the CCA is successful. The subset of the channels may exclude a primary channel when the CCA is not successful in the primary channel. Alternatively or additionally, when the CCA is not successful in a primary channel, the interface circuit may transmit a legacy preamble or short control signaling addressed to the second electronic device in the primary channel, and the legacy preamble or the short control signaling may indicate the subset of the channels. In some embodiments, the multiple second frames may indicate the subset of the channels.

Moreover, the interface circuit may: provide, addressed to the second electronic device, a data frame that includes a field with the indication that the electronic device uses the FBE channel access technique and the attributes of the FBE channel access technique. Note that the data frame may be compatible with the IEEE 802.11 standard. Furthermore, the data frame may indicate whether a first frame in an instance of the FFP includes the field. In some embodiments, the field may include a signal A (SIG-A) field or a signal B (SIG-B) field.

Furthermore, the interface circuit may: predict that an instance of the FFP will be underutilized; and provide, addressed to the second electronic device, a second frame during the instance of the FFP that indicates that the second electronic device is allowed to contend for a channel during the instance of the FFP using an EDCA technique or another contention-based channel access technique. Note that the second frame may be communicated in a primary channel.

Additionally, the electronic device may include an access point.

In some embodiments, when interference with a legacy device that is not compatible with the IEEE 802.11 standard occurs in a channel during an instance of the FFP, the interface circuit may: provide, addressed to the legacy device, a probe response or a management frame during the instance of the FFP, where the probe response is an unsolicited probe response, another management frame, or is in in response to a probe request associated with the legacy device that was received during the instance of the FFP, and the probe response or the other management frame includes a restriction on transmission by the legacy device during the use of the FBE channel access technique; provide, addressed to the legacy device, a recommendation to perform a basic service set transition to a second channel, which is different from the channel; transition to a second link of the same basic service set that operates under other than FBE channel access; or change a primary channel used by the electronic device during the use of the FBE channel access technique.

Moreover, when the electronic device is capable of simultaneous transmitting and receiving in a band of frequencies, the interface circuit may: communicate with the second electronic device using the FBE channel access technique in a subset of channels in the band of frequencies; and communicate with the second electronic device using the EDCA technique or the other contention-based channel access technique in a second subset of the channels in the band of frequencies. Furthermore, the interface circuit may communicate with the second electronic device using the FBE channel access technique in a third subset of channels in the band of frequencies, where the subset of the channels and the third subset of the channels are different. Note that at least some attributes of the FBE channel access technique in the subset of the channels and the third subset of the channels may be different. Additionally, when a CCA during an instance of the FFP in a channel in the subset of the channels is unsuccessful, the interface circuit may provide, addressed to the second electronic device, an instruction to transition communication of traffic associated with the second electronic device from the channel to a second channel in the subset of the channels.

Other embodiments provide the second electronic device that performs counterpart operations to at least some of the operations performed by the electronic device.

Other embodiments provide an integrated circuit (such as the interface circuit) for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

In a second group of embodiments, a second electronic device that receives a frame is described. This second electronic device includes: an antenna node communicatively coupled to an antenna; and a second interface circuit, communicatively coupled to the antenna node, that communicates with an electronic device. During operation the second interface circuit receives, associated with the electronic device, the frame that includes an indication that the electronic device uses an FBE channel access technique and attributes of the FBE channel access technique. The attributes include: a duration of the FBE channel access technique, and a FFP for communication during the FBE channel access technique. Moreover, the frame is compatible with an IEEE 802.11 standard.

Note that, in response to receiving the indication, the second interface circuit may immediately cease use of an EDCA technique or another contention-based channel access technique during communication with the electronic device, or the second interface circuit may postpone use of the EDCA technique or the other contention-based channel access technique until it is addressed during the subsequent communication associated with the electronic device or until expiration of a time interval.

Moreover, in response to receiving the indication, the second interface circuit may cease use, after a second time interval, of the EDCA technique or the other contention-based channel access technique during communication with the electronic device.

Furthermore, when the attributes indicate an end time for use of the FBE channel access technique, the second interface circuit may: cease use, at the end time, of the FBE channel access technique during communication with the electronic device; and enable use, at the end time, of the EDCA technique or the other contention-based channel access technique during communication with the electronic device.

Additionally, the frame may include a beacon frame or another type of management frame.

In some embodiments, the second interface circuit may receive a second frame associated with the electronic device during an instance of the FFP. After receiving the second frame, the second interface circuit may provide, addressed to the electronic device, an acknowledgment or a block acknowledgement during the remainder of the instance of the FFP. For example, receiving the second frame may include receiving multiple second frames separated by at least an interframe space. Moreover, the second frame may include a trigger frame and the second interface circuit may provide, after the trigger frame and addressed to the electronic device, a third frame during the remainder of the instance of the FFP. Furthermore, the second frame may include a beacon frame during an instance of the FFP that indicates one or more intended recipients of one or more subsequent third frames transmitted during the instance of the FFP and the one or more intended recipients include the second electronic device.

Additionally, the second frame may include multiple second frames in at least a subset of channels during the instance of the FFP. The subset of the channels may exclude a primary channel. In some embodiments, the second interface circuit may receive a legacy preamble or short control signaling associated with the electronic device in a primary channel during the instance of the FFP, where the legacy preamble or the short control signaling indicates the subset of the channels. Note that the multiple second frames may indicate the subset of the channels.

Moreover, the second interface circuit may: receive, associated with the electronic device, a data frame, where the data frame includes a field that includes the indication that the electronic device uses the FBE channel access technique and the attributes of the FBE channel access technique. Note that the data frame may be compatible with the IEEE 802.11 standard. In some embodiments, the data frame may indicate whether a first frame in an instance of the FFP includes the field. Furthermore, the field may include a SIG-A field or a SIG-B field.

Additionally, the second interface circuit may: receive a second frame associated with the electronic device during an instance of the FFP and the second frame indicates that the second electronic device is allowed to contend for a channel during the instance of the FFP using the EDCA technique or the other contention-based channel access technique. Note that the second frame may be communicated in a primary channel.

In some embodiments, the electronic device may include an access point.

Note that, when the second electronic device includes a legacy device that is not compatible with the IEEE 802.11 standard, the second interface circuit may: provide, addressed to the electronic device, a probe request during an instance of the FFP; and receive, associated with the electronic device, a probe response or a management frame during the instance of the FFP, where the probe response or the management frame is in response to the probe request and the probe response or the management frame includes a restriction on transmission by the second electronic device during the use of the FBE channel access technique.

Moreover, when the second electronic device includes a legacy device that is not compatible with the IEEE 802.11 standard, the second interface circuit may receive, associated with the electronic device, a recommendation to perform a basic service set transition to a different channel than a channel currently used by the second electronic device.

Furthermore, the second interface circuit may: communicate with the electronic device using the FBE channel access technique in a subset of channels in the band of frequencies; and communicate with the electronic device using the EDCA technique or the other contention-based channel access technique in a second subset of the channels in the band of frequencies. Additionally, the second interface circuit may communicate with the electronic device using the FBE channel access technique in a third subset of channels in the band of frequencies, where the subset of the channels and the third subset of the channels are different. Note that at least some attributes of the FBE channel access technique in the subset of the channels and the third subset of the channels are different. In some embodiments, the second interface circuit may receive, associated with the electronic device, an instruction to transition communication of traffic associated with the second electronic device to a different channel than is currently being used in the subset of the channels.

Other embodiments provide the electronic device that performs counterpart operations to at least some of the operations performed by the second electronic device.

Other embodiments provide an integrated circuit (such as the second interface circuit) for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
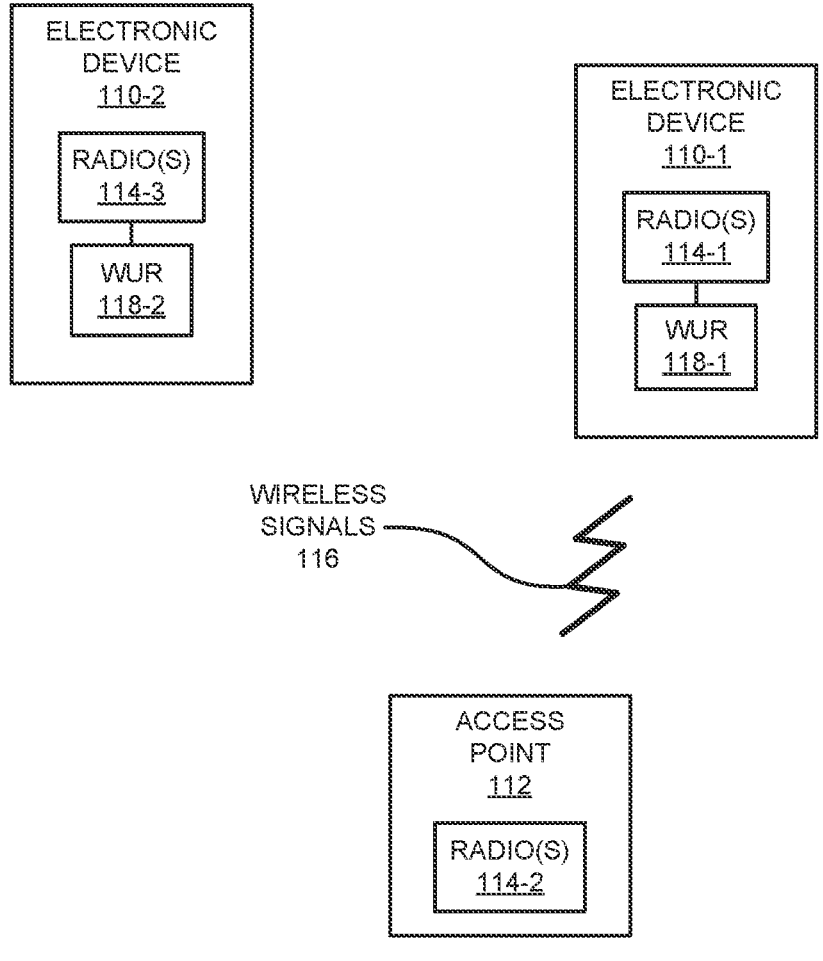
FIG. 1 is a block diagram illustrating an example of communication between electronic devices.

In a first group of embodiments, an electronic device (such as an access point) that provides a frame is described. This electronic device includes: an antenna node communicatively coupled to an antenna; and an interface circuit, communicatively coupled to the antenna node, that communicates with a second electronic device. During operation, the interface circuit provides, addressed to the second electronic device, the frame that includes an indication that the electronic device uses an FBE channel access technique and attributes of the FBE channel access technique. The attributes include: a duration of the FBE channel access technique, and an FFP for communication during the FBE channel access technique. Moreover, the frame is compatible with an IEEE 802.11 standard.

Moreover, in a second group of embodiments, a second electronic device that receives a frame is described. This second electronic device includes: an antenna node communicatively coupled to an antenna; and a second interface circuit, communicatively coupled to the antenna node, that communicates with an electronic device. During operation the second interface circuit receives, associated with the electronic device, the frame that includes an indication that the electronic device uses an FBE channel access technique and attributes of the FBE channel access technique. The attributes include: a duration of the FBE channel access technique, and a FFP for communication during the FBE channel access technique. Moreover, the frame is compatible with the IEEE 802.11 standard.

By communicating the indication and the attributes, these communication techniques may facilitate the selective use of the FBE channel access technique during the communication between the electronic device and the second electronic device. The selective use of the FBE channel access technique may allow the electronic device and the second electronic device to communicate frames or packets associated with low-latency applications, such as augmented and/or virtual reality. Notably, the FBE channel access technique may reduce channel access delay and improve channel access efficiency. Consequently, the communication techniques may more be convenient, less complicated, and more secure than existing channel access techniques. Therefore, the communication techniques may improve the user experience when using the electronic device and/or the second electronic device.

In the discussion that follows, a user may include: an individual, an organization, a company, a governmental agency, a for-profit business entity, a not-for-profit entity, or a group of one or more individuals.

Note that the communication techniques may be used during or with wired or wireless communication between electronic devices in accordance with a communication protocol, such as a communication protocol that is compatible with an IEEE 802.11 standard (which is sometimes referred to as Wi-Fi). However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

The electronic device and/or the second electronic device can include hardware and software to support a wireless personal area network (WPAN) according to a WPAN communication protocol, such as those standardized by the Bluetooth Special Interest Group and/or those developed by Apple (in Cupertino, California) that are referred to as an Apple Wireless Direct Link (AWDL). Moreover, the electronic device and/or the second electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device and/or the second electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, IEEE 802.11me, IEEE802.11bx, or other present or future developed IEEE 802.11 technologies.

Note that the electronic device and/or the second electronic device may use multi-user transmission (such as OFDMA) and/or multiple-input multiple-output (MIMO).

In some embodiments, the electronic device and/or the second electronic device can act as a communications hub that provides access to a WLAN and/or to a WWAN and, thus, to a wide variety of services that can be supported by various applications executing on the electronic device and/or the second electronic device. Thus, the electronic device and/or the second electronic device may include an 'access point' that communicates wirelessly with other electronic devices (such as using Wi-Fi), and that provides access to another network (such as the Internet) via IEEE 802.3 (which is sometimes referred to as 'Ethernet'). Note that the access point may be a physical access point or a virtual or 'software' access point that is implemented on a computer or an electronic device. However, in other embodiments the electronic device and/or the second electronic device may not be an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or (equivalently) beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'clients,' 'stations,' or 'recipient electronic devices.'

Figure 14:
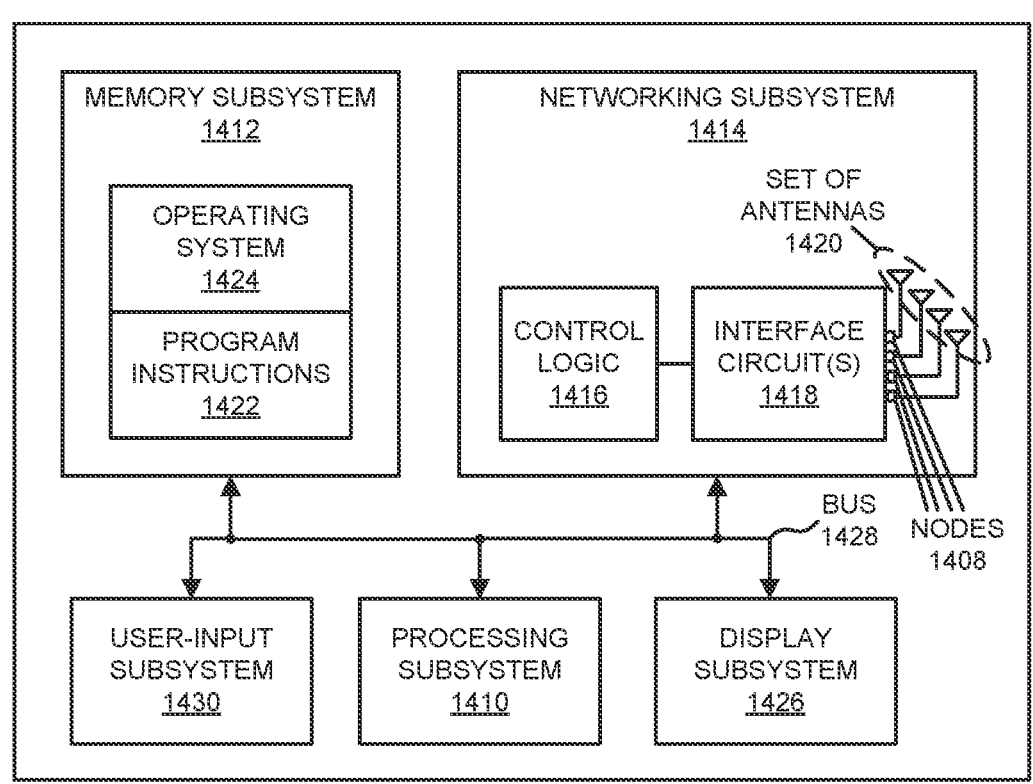
FIG. 14 illustrates an example of an electronic device of FIG. 1 according to some embodiments of the disclosure.

As described further below with reference to FIG. 14, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacon frames on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-13, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

Figure 2:
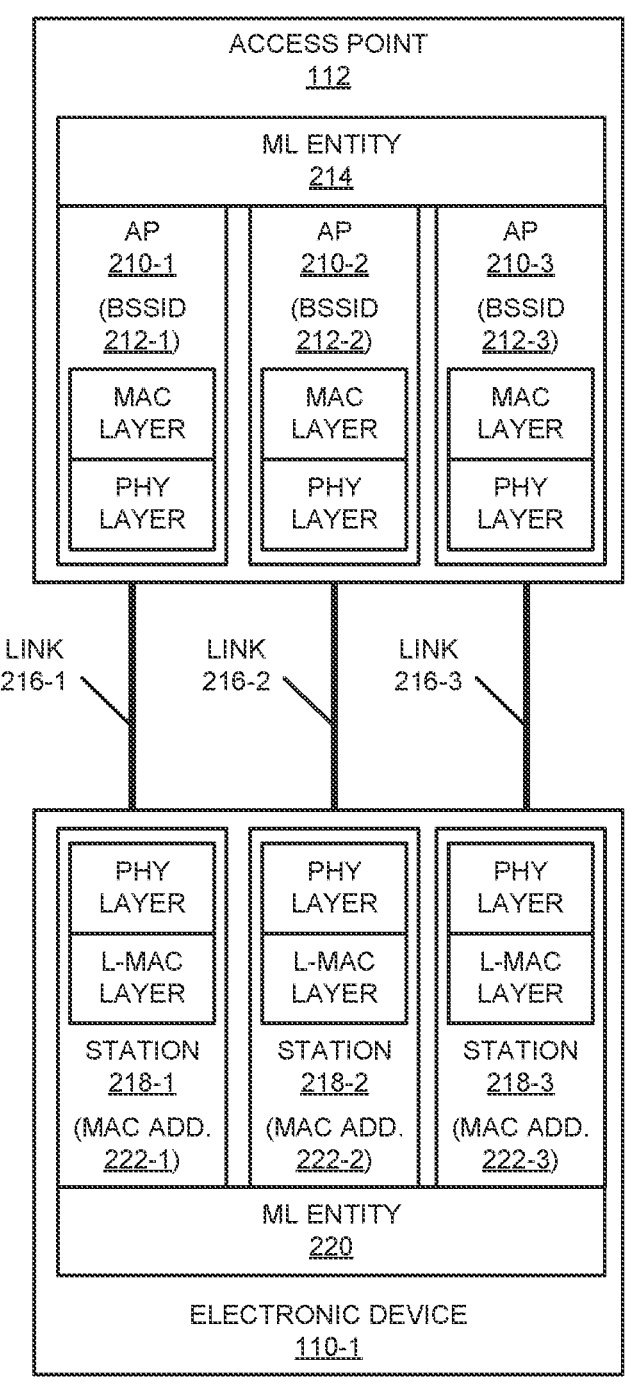
FIG. 2 is a block diagram illustrating an example of communication between electronic devices.

IEEE 802.11be has proposed the use of multiple concurrent links between electronic devices, such as access point 112 and one or more of electronic device 110. For example, as shown in FIG. 2, which presents a block diagram illustrating an example of electronic devices communicating wirelessly, access point 112 may be an access point multi-link device (MLD) that includes multiple access points 210, which are cohosted or collocated in access point 112. In the present discussion, 'cohosted' or 'co-located' means that access points 210 are physically or virtually implemented in the same access point MLD, or are affiliated with the same access point MLD. Note that this meaning of 'cohosted' does not indicate that access points 210 have the same primary 20 MHz channel. Access points 210 may have associated basic service set identifiers (BSSIDs) 212, and media access control (MAC) and physical (PHY) layers (including separate radios, which may be included in the same or different integrated circuits). Note that access point 112 may have an ML entity 214 having an MLD MAC address, an ML identifier, a service set identifier (SSID), and that may provide security for access points 210.

Moreover, access points 210 may have different concurrent links 216 in different bands of frequencies (such as a link 216-1 with a link identifier 1 in a 2.4 GHz band of frequencies, a link 216-2 with a link identifier 2 in a 5 GHz band of frequencies and a link 216-3 with a link identifier 3 in a 6 GHz bands of frequencies) with stations 218 in at least electronic device 110-1, which is a non-access point MLD. These stations may have associated lower MAC and PHY layers (including separate radios, which may be included in the same or different integrated circuits). In addition, electronic device 110-1 may have an ML entity 220 having an MLD MAC address.

For example, the access point MLD may have three radios. One radio may operate on a 2.4 GHz band of frequencies, and the other radios may operate on the 5/6 GHz bands of frequencies. The access point MLD may create three access points 210, operating on a 2.4 GHz channel, a 5 GHz channel, and a 6 GHz channel respectively. The three access points 210 may operate independently, each of which has at least one BSS with different BSSIDs 212. (While FIG. 2 illustrates the access point MLD with three access points 210, more generally the access point MLD may include up to 15 access points with one or more access points in a given band of frequencies.) Moreover, each of the access points 210 may accommodate both legacy non-access point stations as well as non-access point MLD stations 218. Furthermore, each of access points 210 may transmit its own beacon frames using its own BSSID. Additionally, the access point MLD may have ML entity 214, identified by an MLD address (such as an MLD MAC address). This MAC address may be used to pair with ML entity 220 of the associated non-access point MLD stations 218.

Moreover, the non-access point MLD station (e.g., electronic device 110-1) may have two or three radios. One radio may operate on a 2.4 GHz band of frequencies, and the other radios may operate on the ⅚ GHz bands of frequencies. When the non-access point MLD establishes a ML association with the access point MLD, it may create up to three stations 218, each of which associates to one of access points 210 within the access point MLD. Each of stations 218 may have a different over-the-air MAC address 222. The non-access point MLD may also have ML entity 220, identified by another MLD address (such as another MLD MAC address). This MLD MAC address may be used to pair with ML entity 214 of the associated access point MLD.

Referring back to FIG. 1, as noted previously, existing contention-based channel access techniques often involve increased delays, idle time and, thus, latency. This can be problematic for low-latency applications.

In order to address these problems, as described further below with reference to FIGS. 3-13, in the communication techniques access point 112 and electronic device 110-1 may selectively use an FBE channel access technique. Notably, access point 112 may provide, to electronic device 110-1, a frame that includes an indication that access point 112 uses an FBE channel access technique and attributes of the FBE channel access technique. The attributes may include: a duration of the use of the FBE channel access technique, and an FFP for communication during the FBE channel access technique. Moreover, the frame may be compatible with an IEEE 802.11 standard. As described further below, electronic device 110-1 may receive the frame.

Note that the frame may be dynamically provided based at least in part on a criterion associated with a type of traffic. For example, the criterion may include a latency requirement that is less than a threshold or a QoS that is greater than a second threshold.

The frame may include a beacon frame or another type of management frame.

Transmission (e.g., of a second frame or multiple second frames separated by interface spaces by access point 112) during an instance of the FFP may be based at least in part on a CCA performed by access point 112 for a time interval. For example, access point 112 may transmit the second frame or the multiple second frames addressed to electronic device 110-1 during a remainder of the instance of the FFP following a successful CCA during the instance of the FFP. Note that electronic device 110-1 may respond to receiving the second frame or the multiple second frames by transmitting an acknowledgment or a block acknowledgement during the remainder of the instance of the FFP.

In some embodiments, when the CCA is successful, access point 112 may: transmit a trigger frame addressed to electronic device 110-1 during a remainder of the instance of the FFP; and may receive, after the trigger frame and associated with electronic device 110-1, the second frame or the multiple second frames during the remainder of the instance of the FFP.

Alternatively or additionally, when the CCA is successful, access point 112 may transmit a beacon frame during an instance of the FFP that indicates one or more intended recipients of one or more subsequent second frames to be transmitted during the instance of the FFP and the one or more intended recipients may include electronic device 110-1.

However, when the CCA is not successful, access point 112 may not transmit a second frame addressed to electronic device 110-1 or the trigger frame during the remainder of the instance of the FFP.

Note that the CCA may be performed in channels in a band of frequencies during an instance of the FFP and access point 112 may communicate multiple second frames with electronic device 110-1 using at least a subset of the channels where the CCA is successful. The subset of the channels may exclude a primary channel when the CCA is not successful in the primary channel. Alternatively or additionally, when the CCA is not successful in a primary channel, access point 112 may transmit a legacy preamble or short control signaling addressed to electronic device 110-1 in the primary channel, and the legacy preamble or the short control signaling may indicate the subset of the channels. In some embodiments, the multiple second frames may indicate the subset of the channels.

Moreover, access point 112 may: provide, addressed to electronic device 110-1, a data frame that includes a field with the indication that access point 112 uses the FBE channel access technique and the attributes of the FBE channel access technique. Note that the data frame may be compatible with the IEEE 802.11 standard. Furthermore, the data frame may indicate whether a first frame in an instance of the FFP includes the field. In some embodiments, the field may include a SIG-A field or a SIG-B field.

Furthermore, access point 112 may: predict that an instance of the FFP will be underutilized; and provide, addressed to electronic device 110-1, a second frame during the instance of the FFP that indicates that electronic device 110-1 is allowed to contend for a channel during the instance of the FFP using an EDCA technique or another contention-based channel access technique. Note that the second frame may be communicated in a primary channel.

In some embodiments, when interference with a legacy device that is not compatible with the IEEE 802.11 standard occurs in a channel during an instance of the FFP, access point 112 may: provide, addressed to the legacy device, a probe response or a management frame during the instance of the FFP, where the probe response is an unsolicited probe response, another management frame, or is in in response to a probe request associated with the legacy device that was received during the instance of the FFP, and the probe response or the other management frame includes a restriction on transmission by the legacy device during the use of the FBE channel access technique; provide, addressed to the legacy device, a recommendation to perform a basic service set transition to a second channel, which is different from the channel; transition to a second link of the same basic service set that operates under other than FBE channel access; or change a primary channel used by access point 112 during the use of the FBE channel access technique.

When access point 112 is capable of simultaneous transmitting and receiving in a band of frequencies, access point 112 may: communicate with electronic device 110-1 using the FBE channel access technique in a subset of channels in the band of frequencies; and communicate with electronic device 110-1 using the EDCA technique or the other contention-based channel access technique in a second subset of the channels in the band of frequencies. Furthermore, access point 112 may communicate with electronic device 110-1 using the FBE channel access technique in a third subset of channels in the band of frequencies, where the subset of the channels and the third subset of the channels are different. Note that at least some attributes of the FBE channel access technique in the subset of the channels and the third subset of the channels may be different. Additionally, when a CCA during an instance of the FFP in a channel in the subset of the channels is unsuccessful, access point 112 may provide, addressed to electronic device 110-1, an instruction to transition communication of traffic associated with electronic device 110-1 from the channel to a second channel in the subset of the channels.

As noted previously, electronic device 110-1 may receive the frame associated with access point 112. In response to receiving the indication, electronic device 110-1 may immediately cease use of an EDCA technique or another contention-based channel access technique during communication with access point 112, or electronic device 110-1 may postpone use of the EDCA technique or the other contention-based channel access technique until it is addressed during the subsequent communication associated with access point 112 or until expiration of a time interval. Moreover, in response to receiving the indication, electronic device 110-1 may cease use, after a second time interval, of the EDCA technique or the other contention-based channel access technique during communication with access point 112. Furthermore, when the attributes indicate an end time for use of the FBE channel access technique, electronic device 110-1 may: cease use, at the end time, of the FBE channel access technique during communication with access point 112; and enable use, at the end time, of the EDCA technique or the other contention-based channel access technique during communication with access point 112.

Additionally, electronic device 110-1 may receive the second frame or the multiple second frames associated with access point 112 during an instance of the FFP. After receiving the second frame, electronic device 110-1 may provide, addressed to access point 112, the acknowledgment or the block acknowledgement during the remainder of the instance of the FFP. For example, the second frame may include a trigger frame and electronic device 110-1 may provide, after the trigger frame and addressed to access point 112, a third frame during the remainder of the instance of the FFP. Furthermore, the second frame may include a beacon frame during an instance of the FFP that indicates one or more intended recipients of one or more subsequent third frames transmitted during the instance of the FFP and the one or more intended recipients may include access point 112.

In some embodiments, the second frame may include multiple second frames in at least a subset of channels during the instance of the FFP. The subset of the channels may exclude a primary channel. In some embodiments, electronic device 110-1 may receive a legacy preamble or short control signaling associated with access point 112 in a primary channel during the instance of the FFP, where the legacy preamble or the short control signaling indicates the subset of the channels. Note that the multiple second frames may indicate the subset of the channels.

Moreover, electronic device 110-1 may: receive, associated with access point 112, a data frame, where the data frame includes a field that includes the indication that access point 112 uses the FBE channel access technique and the attributes of the FBE channel access technique. Note that the data frame may be compatible with the IEEE 802.11 standard. In some embodiments, the data frame may indicate whether a first frame in an instance of the FFP includes the field. Furthermore, the field may include a SIG-A field or a SIG-B field.

Furthermore, electronic device 110-1 may: receive a second frame associated with access point 112 during an instance of the FFP and the second frame indicates that electronic device 110-1 is allowed to contend for a channel during the instance of the FFP using the EDCA technique or the other contention-based channel access technique. Note that the second frame may be communicated in a primary channel.

Note that, when electronic device 110-1 includes a legacy device that is not compatible with the IEEE 802.11 standard, electronic device 110-1 may: provide, addressed to access point 112, a probe request during an instance of the FFP; and receive, associated with access point 112, a probe response or another management frame during the instance of the FFP, where the probe response or the management frame is in response to the probe request and the probe response or the management frame includes a restriction on transmission by electronic device 110-1 during the use of the FBE channel access technique. Moreover, when electronic device 110-1 includes a legacy device that is not compatible with the IEEE 802.11 standard, electronic device 110-1 may receive, associated with access point 112, a recommendation to perform a basic service set transition to a different channel than a channel currently used by electronic device 110-1.

Furthermore, electronic device 110-1 may: communicate with access point 112 using the FBE channel access technique in a subset of channels in the band of frequencies; and communicate with access point 112 using the EDCA technique or the other contention-based channel access technique in a second subset of the channels in the band of frequencies. Additionally, electronic device 110-1 may communicate with access point 112 using the FBE channel access technique in a third subset of channels in the band of frequencies, where the subset of the channels and the third subset of the channels are different. Note that at least some attributes of the FBE channel access technique in the subset of the channels and the third subset of the channels are different. In some embodiments, electronic device 110-1 may receive, associated with access point 112, an instruction to transition communication of traffic associated with electronic device 110-1 to a different channel than is currently being used in the subset of the channels.

In summary, the disclosed communication techniques may facilitate the selective use of the FBE channel access techniques during communication between access point 112 and electronic device 110-1. This capability may allow access point 112 and electronic device 110-1 to communicate frames or packets associated with low-latency applications, such as augmented and/or virtual reality. Notably, the FBE channel access techniques may reduce channel access delay and improve channel access efficiency. Consequently, the communication techniques may more be convenient, less complicated, and more secure than existing channel access techniques. Therefore, the communication techniques may improve the user experience and customer satisfaction.

While the preceding discussion illustrated use of the instance of the FFP in the FBE channel access technique by access point 112, in other embodiments the roles of access point 112 and electronic device 110-1 may be reversed in the communication techniques.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a predetermined or predefined time interval (such as a time interval between, e.g., 1 and 10 s) to an estimated maximum number of bytes that can be communicated in the predetermined or predefined time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 3:
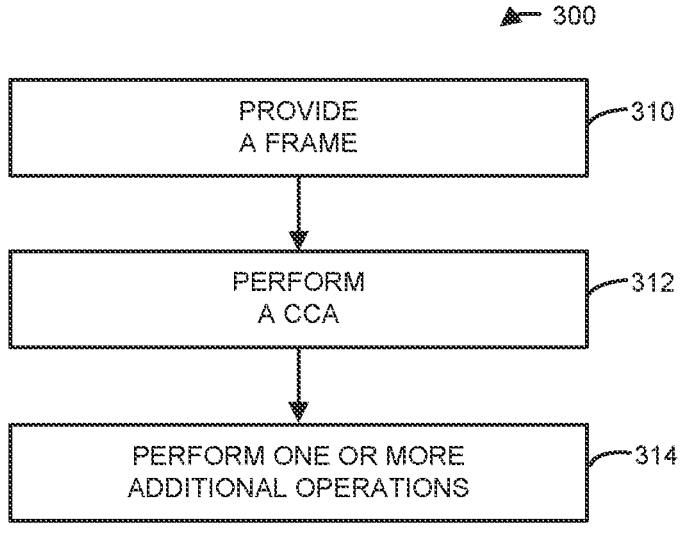
FIG. 3 is a flow diagram illustrating an example method for providing a frame using an electronic device of FIG. 1 or 2.

FIG. 3 presents a flow diagram illustrating an example method 300 for providing a frame. This method may be performed by an electronic device, such as access point 112 in FIG. 1. For example, method 300 may be implemented by an interface circuit in access point 112 in FIG. 1. Note that the communication between the electronic device and a second electronic device (such as electronic device 110-1 in FIG. 1) may be compatible with an IEEE 802.11 communication protocol.

During operation, the electronic device provides, addressed to the second electronic device, the frame (operation 310) that includes an indication that the electronic device uses an FBE channel access technique and attributes of the FBE channel access technique. The attributes include: a duration of the FBE channel access technique, and an FFP for communication during the FBE channel access technique. Moreover, the frame is compatible with an IEEE 802.11 standard.

Note that the electronic device may dynamically provide the frame based at least in part on a criterion associated with a type of traffic. For example, the criterion may include a latency requirement that is less than a threshold or a QoS that is greater than a second threshold.

Moreover, the frame may include a beacon frame or another type of management frame.

Furthermore, the electronic device performs, during an instance of the FFP, a CCA (operation 312) for a time interval.

In some embodiments, the electronic device may optionally perform one or more additional operations (operation 314). For example, when the CCA is successful (operation 312), the electronic device may transmit a second frame addressed to the second electronic device during a remainder of the instance of the FFP. Additionally, after transmitting the second frame, the electronic device may receive, associated with the second electronic device, an acknowledgment or a block acknowledgement during the remainder of the instance of the FFP. Note that transmitting the second frame may include transmitting multiple second frames separated by at least an interframe space.

Moreover, when the CCA is successful (operation 312), the electronic device may: transmit a trigger frame addressed to the second electronic device during a remainder of the instance of the FFP; and receive, after the trigger frame and associated with the second electronic device, a second frame during the remainder of the instance of the FFP.

Furthermore, when the CCA is successful (operation 312), the electronic device may transmit a beacon frame during an instance of the FFP that indicates one or more intended recipients of one or more subsequent second frames to be transmitted during the instance of the FFP and the one or more intended recipients include the second electronic device.

Alternatively, when the CCA is not successful (operation 312), the electronic device may not transmit a second frame addressed to the second electronic device during a remainder of the instance of the FFP.

Note that the CCA may be performed (operation 312) in channels in a band of frequencies during an instance of the FFP and the electronic device may communicate multiple second frames with the second electronic device using at least a subset of the channels where the CCA is successful (operation 312). The subset of the channels may exclude a primary channel when the CCA is not successful (operation 312) in the primary channel. Alternatively or additionally, when the CCA is not successful (operation 312) in a primary channel, the electronic device may transmit a legacy preamble or short control signaling addressed to the second electronic device in the primary channel, and the legacy preamble or the short control signaling may indicate the subset of the channels. In some embodiments, the multiple second frames may indicate the subset of the channels.

Moreover, the electronic device may: provide, addressed to the second electronic device, a data frame that includes a field with the indication that the electronic device uses the FBE channel access technique and the attributes of the FBE channel access technique. Note that the data frame may be compatible with the IEEE 802.11 standard. Furthermore, the data frame may indicate whether a first frame in an instance of the FFP includes the field. In some embodiments, the field may include a SIG-A field or a SIG-B field.

Furthermore, the electronic device may: predict that an instance of the FFP will be underutilized; and provide, addressed to the second electronic device, a second frame during the instance of the FFP that indicates that the second electronic device is allowed to contend for a channel during the instance of the FFP using an EDCA technique or another contention-based channel access technique. Note that the second frame may be communicated in a primary channel.

Additionally, when interference with a legacy device that is not compatible with the IEEE 802.11 standard occurs in a channel during an instance of the FFP, the electronic device may: provide, addressed to the legacy device, a probe response or the management frame during the instance of the FFP, where the probe response is an unsolicited probe response, another management frame, or is in in response to a probe request associated with the legacy device that was received during the instance of the FFP, and the probe response or the other management frame comprises a restriction on transmission by the legacy device during the use of the FBE channel access technique; provide, addressed to the legacy device, a recommendation to perform a basic service set transition to a second channel, which is different from the channel; transition to a second link of the same basic service set that operates under other than FBE channel access; or change a primary channel used by the electronic device during the use of the FBE channel access technique.

In some embodiments, when the electronic device is capable of simultaneous transmitting and receiving in a band of frequencies, the electronic device may: communicate with the second electronic device using the FBE channel access technique in a subset of channels in the band of frequencies; and communicate with the second electronic device using the EDCA technique or the other contention-based channel access technique in a second subset of the channels in the band of frequencies. Furthermore, the electronic device may communicate with the second electronic device using the FBE channel access technique In a third subset of channels in the band of frequencies, where the subset of the channels and the third subset of the channels are different. Note that at least some attributes of the FBE channel access technique in the subset of the channels and the third subset of the channels may be different. Additionally, when a CCA during an instance of the FFP in a channel in the subset of the channels is unsuccessful (operation 312), the electronic device may provide, addressed to the second electronic device, an instruction to transition communication of traffic associated with the second electronic device from the channel to a second channel in the subset of the channels.

Figure 4:
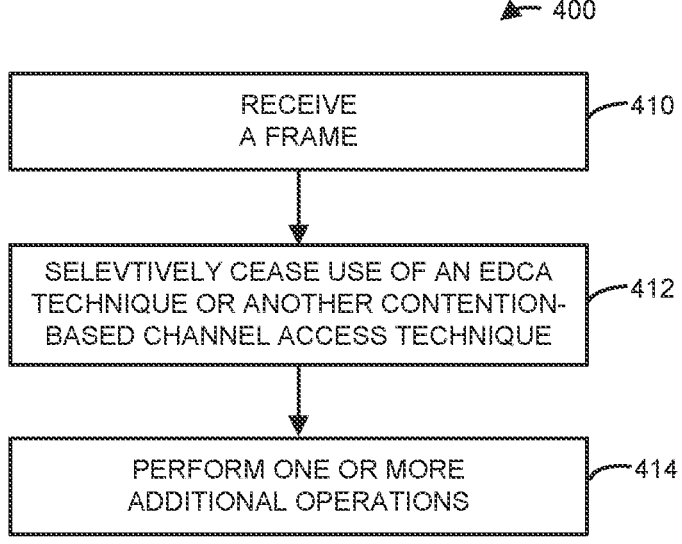
FIG. 4 is a flow diagram illustrating an example method for receiving a frame using an electronic device of FIG. 1 or 2.

FIG. 4 presents a flow diagram illustrating an example method 400 for receiving a frame. This method may be performed by a second electronic device, such as electronic device 110-1 in FIG. 1. For example, method 300 may be implemented by an interface circuit in electronic device 110-1 in FIG. 1. Note that the communication between the second electronic device and an electronic device (such as access point 112 in FIG. 1) may be compatible with an IEEE 802.11 communication protocol.

During operation, the second electronic device receive, associated with the electronic device, the frame (operation 410) that includes an indication that the electronic device uses an FBE channel access technique and attributes of the FBE channel access technique. The attributes include: a duration of the FBE channel access technique, and a FFP for communication during the FBE channel access technique. Moreover, the frame is compatible with an IEEE 802.11 standard.

Note that the frame may include a beacon frame or another type of management frame.

In response to receiving the indication (operation 410), the second electronic device may selectively cease use of an EDCA technique or another contention-based channel access technique during communication with the electronic device. For example, the second electronic device may immediately cease use of an EDCA technique or another contention-based channel access technique during communication with the electronic device, or the second electronic device may postpone use of the EDCA technique or the other contention-based channel access technique until it is addressed during the subsequent communication associated with the electronic device or until expiration of a time interval. Moreover, in response to receiving the indication, the second electronic device may cease use, after a second time interval, of the EDCA technique or the other contention-based channel access technique during communication with the electronic device. Furthermore, when the attributes indicate an end time for use of the FBE channel access technique, the electronic device may: cease use, at the end time, of the FBE channel access technique during communication with the electronic device; and enable use, at the end time, of the EDCA technique or the other contention-based channel access technique during communication with the electronic device.

In some embodiments, the second electronic device may optionally perform one or more additional operations (operation 414). For example, the second electronic device may receive a second frame associated with the electronic device during an instance of the FFP. After receiving the second frame, the second electronic device may provide, addressed to the electronic device, an acknowledgment or a block acknowledgement during the remainder of the instance of the FFP. Note that receiving the second frame may include receiving multiple second frames separated by at least an interframe space. Moreover, the second frame may include a trigger frame and the second electronic device may provide, after the trigger frame and addressed to the electronic device, a third frame during the remainder of the instance of the FFP. Furthermore, the second frame may include a beacon frame during an instance of the FFP that indicates one or more intended recipients of one or more subsequent third frames transmitted during the instance of the FFP and the one or more intended recipients include the second electronic device.

Additionally, the second frame may include multiple second frames in at least a subset of channels during the instance of the FFP. The subset of the channels may exclude a primary channel. In some embodiments, the second electronic device may receive a legacy preamble or short control signaling associated with the electronic device in a primary channel during the instance of the FFP, where the legacy preamble or the short control signaling indicates the subset of the channels. Note that the multiple second frames may indicate the subset of the channels.

Moreover, the second electronic device may: receive, associated with the electronic device, a data frame, where the data frame includes a field that includes the indication that the electronic device uses the FBE channel access technique and the attributes of the FBE channel access technique. Note that the data frame may be compatible with the IEEE 802.11 standard. In some embodiments, the data frame may indicate whether a first frame in an instance of the FFP includes the field. Furthermore, the field may include a SIG-A field or a SIG-B field.

Furthermore, the second electronic device may: receive a second frame associated with the electronic device during an instance of the FFP and the second frame may indicate that the second electronic device is allowed to contend for a channel during the instance of the FFP using the EDCA technique or the other contention-based channel access technique. Note that the second frame may be communicated in a primary channel.

Note that, when the second electronic device includes a legacy device that is not compatible with the IEEE 802.11 standard, the second electronic device may: provide, addressed to the electronic device, a probe request during an instance of the FFP; and receive, associated with the electronic device, a probe response or a management frame during the instance of the FFP, where the probe response or the management frame is in response to the probe request and the probe response or the management frame includes a restriction on transmission by the second electronic device during the use of the FBE channel access technique.

Additionally, when the second electronic device includes a legacy device that is not compatible with the IEEE 802.11 standard, the second electronic device may receive, associated with the electronic device, a recommendation to perform a basic service set transition to a different channel than a channel currently used by the second electronic device.

In some embodiments, the second electronic device may: communicate with the electronic device using the FBE channel access technique in a subset of channels in the band of frequencies; and communicate with the electronic device using the EDCA technique or the other contention-based channel access technique in a second subset of the channels in the band of frequencies. Additionally, the second electronic device may communicate with the electronic device using the FBE channel access technique in a third subset of channels in the band of frequencies, where the subset of the channels and the third subset of the channels are different. Note that at least some attributes of the FBE channel access technique in the subset of the channels and the third subset of the channels are different. In some embodiments, the second electronic device may receive, associated with the electronic device, an instruction to transition communication of traffic associated with the second electronic device to a different channel than is currently being used in the subset of the channels.

In some embodiments of methods 300 (FIG. 3), and/or 400, there may be additional or fewer operations. Further, one or more different operations may be included. Moreover, the order of the operations may be changed, and/or two or more operations may be combined into a single operation or performed at least partially in parallel.

Figure 5:
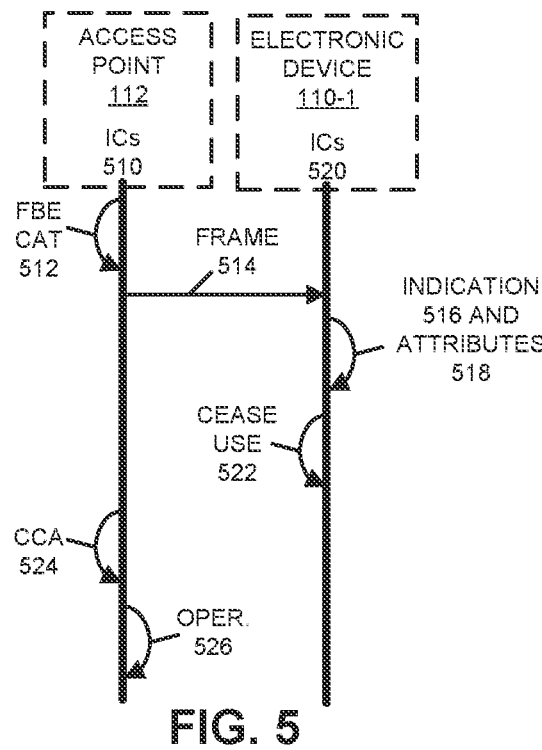
FIG. 5 is a drawing illustrating an example of communication between the electronic devices of FIG. 1 or 2.

The communication techniques are further illustrated in FIG. 5, which presents a flow diagram illustrating an example of communication between electronic device 110-1 and access point 112. During operation, one or more interface circuits (or interface circuitry) 510 in access point 112 may determine to dynamically use an FBE channel access technique (CAT) 512. For example, the determination may be based at least in part on a latency requirement and/or a QoS associated with a type of traffic (such as a low-latency type of traffic).

Then, the one or more interface circuits 510 may provide, to electronic device 110-1, a frame 514 (such as a beacon or a management frame) that includes an indication 516 that access point 112 uses an FBE channel access technique and attributes 518 of the FBE channel access technique.

After receiving frame 514, one or more interface circuits (or interface circuitry) 520 in electronic device 110-1 may extract indication 516 and attributes 518. Next, the one or more interface circuits 520 may selectively cease use 522 of an EDCA technique or another contention-based channel access technique during communication with the electronic device. For example, the use of the EDCA technique or the other contention-based channel access technique may be ceased 522 immediately or may selectively cease use 522 after a time interval specified by attributes 518 (such as a start time and an end time of the use of the FBE channel access technique 512 by access point 112).

Moreover, the one or more interface circuits 510 may perform, during an instance of a FFP, a CCA 524 for a second time interval. Next, the one or more interface circuits 510 may selectively perform one or more additional operations 526 based at least in part on CCA 524. For example, when CCA 524 is successful, the one or more interface circuits 510 may transmit one or more second frames to electronic device 110-1 during a remainder of the instance of the FFP. Furthermore, after receiving the one or more second frames, the one or more interface circuits 520 may provide, to access point 112, an acknowledgment or a block acknowledgement during the remainder of the instance of the FFP. Alternatively, when CCA 524 is successful, the one or more interface circuits 510 may transmit a trigger frame to electronic device 110-1 during the remainder of the instance of the FFP. After receiving the trigger frame, the one or more interface circuits 520 may provide one or more third frames to access point 112 during the remainder of the instance of the FFP. However, when CCA 524 is not successful, the one or more interface circuits 510 may not transmit the one or more second frames to electronic device 110-1 during the remainder of the instance of the FFP.

While communication between the components in FIG. 5 is illustrated with unilateral or bilateral communication (e.g., lines having a single arrow or dual arrows), in general a given communication operation may be unilateral or bilateral.

We now further describe embodiments of the disclosed communication techniques. As noted previously, existing channel access techniques are typically associated with randomness and delay. For example, many existing Wi-Fi communication protocols have implemented an EDCA channel access technique. However, in principle, regulations in the United States of America and the European Union allow for a more flexible and less restrictive channel access. For example, see European Telecommunications Standards Institute (ESTI) EN 301 893/5 GHz or EN 303 687/6 GHz. Moreover, ETSI broadband radio access network (BRAN) specifications EN 301 893/5 GHz and EN 303 687/6 GHz allow two modes of channel access. Notably, load-based equipment (LBE), which is similar to EDCA channel access with fewer restrictions; and FBE, which involves semi-periodic channel access (which may offer reduced latency/delay). Furthermore, the Third Generation Partnership Project (3GPP) New Radio (NR) Unlicensed Release 16 includes use of LBE and FBE in 5 GHz and 6 GHz frequency bands. This communication protocol is typically used for quality of service or QoS (semi-static channel access) and low latency, such as for industrial Internet-of-things (IoT). While some Wi-Fi communication protocols use a more-restrictive version of LBE, no existing Wi-Fi communication protocols use FBE.

Figure 6:
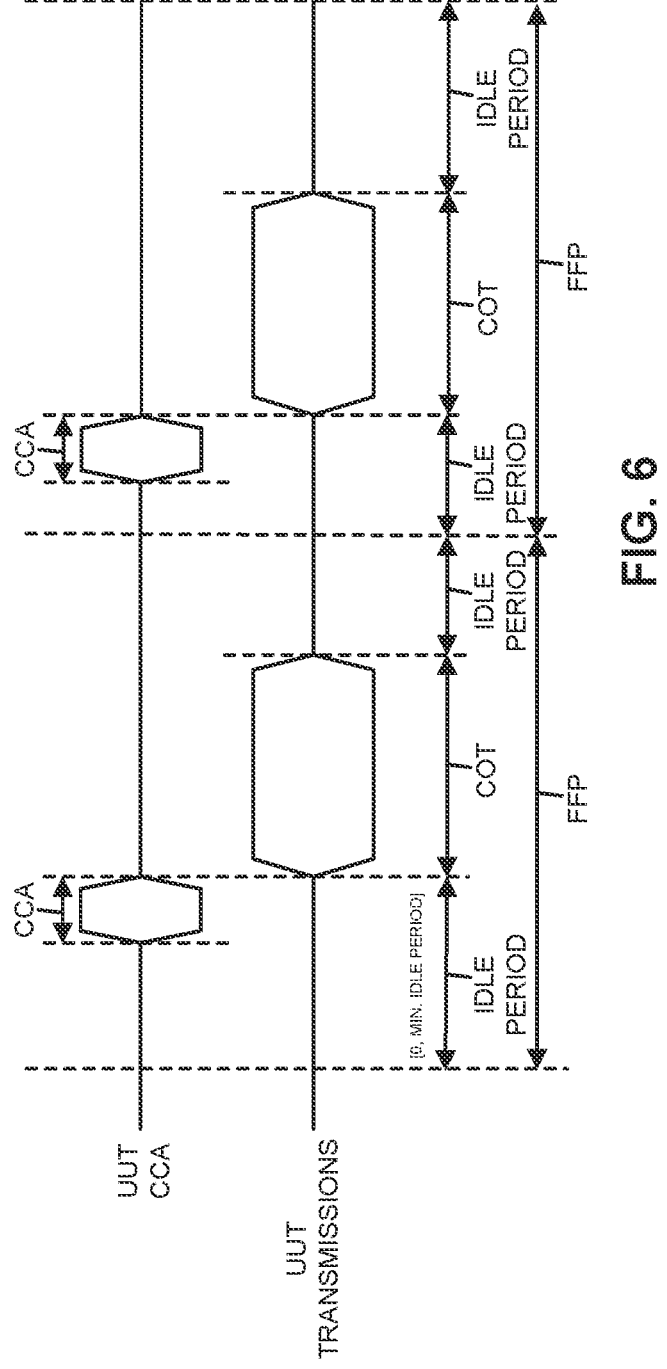
FIG. 6 is a drawing illustrating an example of timing for a frame-based equipment (FBE).

Furthermore, as shown in FIG. 6, which presents a drawing illustrating an example of timing for a FBE, in the ETSI FBE mode the transmission structure is periodic. Notably, the time may be partitioned into FFPs. During a given FFP, there is an idle period followed by CCA. When the CCA is successful, there is a transmit or receive channel occupancy time (COT) followed by another idle period. Alternatively, when the CCA fails, there is no transmission until the subsequent FFP. Note that CCA is performed for at least 18 µs, and the minimum idle period is at least 5% of the COT used during the current FFP. In addition, there may be multiple transmissions within a COT without an additional CCA by using gaps of less than 16 µs.

Additionally, short control signaling transmissions to send management and control frames without sensing the channel for the presence of other signals may be used in FBE and LBE. Notably, FBE and LBE may be allowed to have short control signaling (SCS) transmission on the channel provided these transmissions: are within a 50 ms observation period, the number of SCS transmissions by an electronic device may be less than or equal to 50; and the total duration of the SCS transmissions by an electronic device may be less than 2500 µs within the observation period.

In some embodiments of the communication techniques, next generation Wi-Fi may include operation using FBE. Notably, an IEEE 802.11 standardization body has recently started a study phase for next-generation Wi-Fi (which is sometimes referred to as 'IEEE 802.11bx' or Wi-Fi 8). An IEEE 802.11bx-compatible access point may adopt a mode of operation based at least in part on FBE using the following operations. Based at least in part on traffic demand that the access point observes (e.g., for low-latency or jitter, high QoS), the access point may dynamically switch to an FBE mode. Then, the access point may announce the operation in the FBE mode in a new information element (IE) that is carried or conveyed in beacon frames or in another management frame. The beacon frame or the other management frame may include relevant attributes of the FBE mode, such as: the FFP duration, the periodicity of the FBE operation, the expected duration of the FBE mode, etc. Note that FFP is sometimes referred to as a transmission opportunity (TXOP).

Additionally, the access point may optionally set one or more fields in the signaling portion (e.g., a signal A or SIG-A field, a SIG-B field or a Universal-SIG or U-SIG field) of some or all frames that the access point transmits during the FBE mode operation. A given one of these fields may include attributes related to FBE operation, e.g., whether the FBE mode is conducted or not, whether the downlink frame that carries the field is the first frame within the FFP of the FBE mode, a duration of the FFP (up to 10 ms), etc. More generally, the signaling portion of some or all frames may provide updates to operation in the FBE mode and an associated list of attributes.

Moreover, before the start of the FFP, the access point may perform CCA (or listen before talk) for a time interval (such as at least 18 µs). The CCA may be based at least in part on energy-detect only and with respect to a threshold, such as −72 dBm per each 20 MHz channel. Alternatively, the CCA may be based at least in part on preamble-detect and with respect to a threshold, such as −72 dBm or a value between −72 dBm and −82 dBm. Note that the duration of the CCA may at least be the CCA duration that Is required by a regulatory authority. However, it may be possible that a further restriction is applied and the CCA duration may be increased by a fixed value, or a random value (where the random value may be drawn from a uniform distribution). In order to have better coexistence with electronic devices that use the same technologies, the CCA may be enhanced by performing preamble-detect instead of energy-detect.

When the outcome of the CCA at the beginning of an FFP is not successful (the CCA fails), the access point may not transmit a frame on the 20 MHz channel and may wait for the next FFP to perform CCA again. Alternatively, when the outcome of the CCA at the beginning of an FFP is successful (e.g., no signal stronger than the threshold is detected), the access point may start a downlink transmission. During each FFP, the access point may perform a downlink transmission to one or more stations. Note that downlink transmissions may be consecutively separated by a short interframe space (SIFS) of 16 us or a PIFS of 25 us. After one SIFS, a station may respond to the downlink frames in the FFP with an acknowledgment (ACK) or a block acknowledgment (BA) in a single-user (SU) frame or in a trigger-based frame. In some embodiments, the access point may restrict uplink transmissions to being based at least in part on a trigger frame and trigger-frame-based frame exchanges. However, as described further below, in some embodiments the signaling portion of some or all downlink frames from the access point during FBE mode operation may indicate the number of FFPs that are available and/or the stations that can use or access one or more of the FFPs using EDCA.

Figure 7:
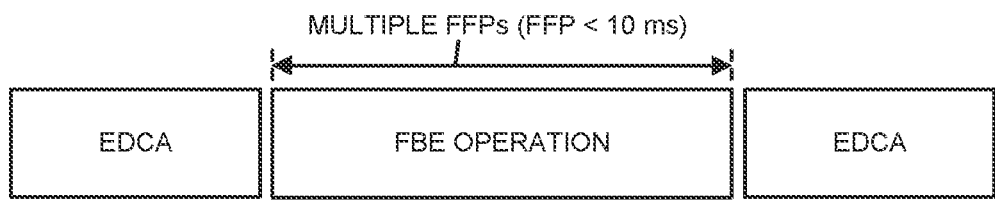
FIG. 7 is a drawing illustrating an example of communication using different channel access techniques.

Furthermore, as shown in FIG. 7, which presents a drawing illustrating an example of communication using different channel access techniques, the access point may start an FFP (after a successful CCA) with transmission of a beacon frame. (Note that an unsuccessful CCA is indicated in FIG. 7 by a cross-hatched box.) The access point may indicate the set of stations that are likely to be addressed by a downlink frame during the FFP. Moreover, the access point may change back to an EDCA mode after serving the specific traffic flows or termination of the specific traffic indicators (TIDs). In order to do so, the access point may set the fields of the information element(s) related to FBE accordingly, and/or may set the relevant fields in the signaling fields (e.g., a SIG-A or a SIG-B field) of each frame accordingly.

A station that is associated with an access point with FBE capability may evaluate beacon frames to identify the presence of an information element with FBE mode attributes. When the information element(s) are identified, the station may evaluate the fields to identify the beginning (or the termination of an ongoing) FBE mode operation and/or other attributes. In some embodiments, the station may immediately stop channel access using EDCA. Alternatively, the station may identify the starting time of the FBE mode of operation and may keep performing channel access according to EDCA until the starting time.

After the station stops channel access using EDCA, the station may monitor downlink frames to identify trigger frames that identify the station as a participant in the follow-up (uplink) trigger-based frame, or to identify trigger frames that have reserved resource units (RUs) for random-access within the trigger-based frame. The station may respond to such a trigger frame with an uplink frame.

Additionally, after the station identifies termination of the FBE mode (as described previously), the station may resume channel access using EDCA. In some embodiments, an unassociated station may evaluate one or more beacon frames and when it identifies information element(s) with FBE attributes, this station may evaluate whether the FBE mode has begun or not. When the FBE mode has begun, the station may refrain from performing channel access using EDCA. Note that the station may send a probe request frame in response to trigger frames with random-access resource units.

In general, during an FBE mode of operation, there may be one or more FFPs. During a given FFP, when the CCA is successful, there may be one or more single-user or multi-user downlink frames separated by a SIFs or a PIFS. Moreover, a station may respond with an acknowledgement or a block acknowledgement after a SIFS. When there is no response (e.g., there is a transmission failure), the access point may perform PIFS recovery. A station may perform uplink transmission using a trigger-based frame (or in response to a downlink trigger frame). The duration of a given FFP may be less than 10 ms, including the 5% duration for the idle period (CCA sensing).

Figure 8:
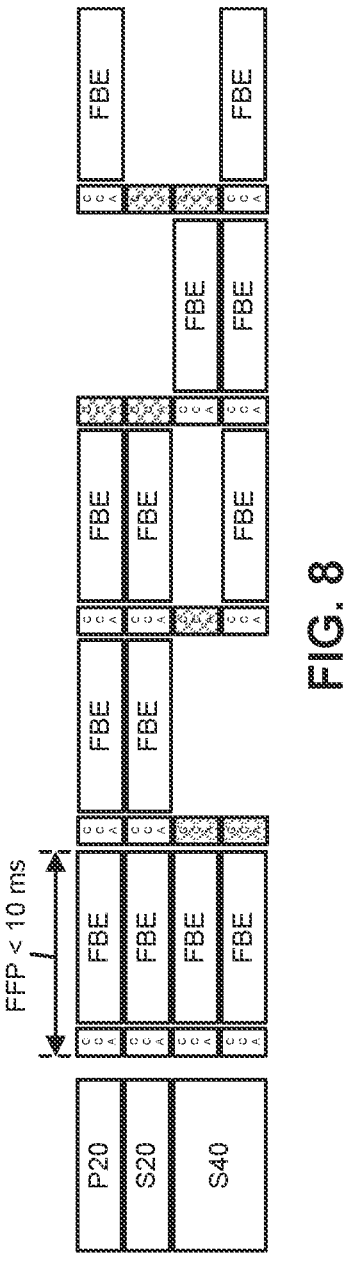
FIG. 8 is a drawing illustrating an example of wideband operation using one or more FBEs.

We now discuss wideband operation in the FBE mode. FIG. 8 presents a drawing illustrating an example of wideband operation using one or more FBEs. Notably, an access point intending to operate FBE on a set of 20 MHz channels may identify that the set of 20 MHz channels as a permitted set by the regulatory authority. The access point may perform channel access for each of the 20 MHz channels according to the operations described previously.

When the CCA is successful for all of the 20 MHz channels, the access point may conduct downlink transmission for the wider bandwidth (e.g., 40 MHz, 80 MHz, or 160 MHz) and may transmit a trigger frame that elicit an uplink trigger-based frame for up to the same bandwidth.

However, in some embodiments, the CCA may be successful for a subset of the 20 MHz channels. When this occurs, the access point may refrain from transmission on the 20 MHz channels with unsuccessful CCA during the duration of the FFP. In order to do so, the access point may transmit downlink frames with punctured transmission on these 20 MHz channels or with narrower bandwidth, so that the 20 MHz channels with unsuccessful CCA are not included. Similarly, the access point may send trigger frames and elicit uplink trigger-based frames with the same restriction for the 20 MHz channels whose CCA failed.

Moreover, the access point may indicate the set of 20 MHz channels that are expected to be punctured during an FFP in some or all of the downlink physical layer protocol data units (PPDUs) or trigger frames. Additionally, the access point may indicate the set of punctured 20 MHz channels in a field that includes FBE attributes in the signaling fields (e.g., a SIG-A or SIG-B field). Note that a station may respond to trigger farms that have identified a set of punctured channels by only transmitting in the identified allowed or non-punctured channels.

Furthermore, when conducting channel access using FBE for a wideband channel, the CCA may fail for some 20 MHz channels. For example, the CCA may be unsuccessful for the primary 20 MHz channel. The following specifies techniques for how a station may identify that the primary 20 MHz channel is punctured, while being able to detect and process the transmission(s) on the remainder of the 20 MHz channels.

Notably, assume that a station has identified that channel access is being conducted according to FBE and identifies the beginning of each FFP. In some embodiment, the station may expect a downlink frame with the bandwidth of the basic service set at the beginning of a given FFP. For example, for an 80 MHz bandwidth, the station may expect an 80 MHz frame at the beginning of the FFP and its receiver may operate with 80 MHz bandwidth for the first frame within the FFP. The station may then evaluate the signaling fields associated with FBE operation in the SIG-A and/or SIG-B fields of the received frame to identify whether the primary 20 MHz is punctured or not. Next, the station may apply the obtained puncturing pattern for the rest of the FFP.

Alternatively, in some embodiments, when at the beginning of an FFP, the station does not receive any signal at the primary 20 MHz channel (e.g., it does not detect a legacy preamble), the station may perform frame detection on the full bandwidth of the basic service set in order to detect the SIG-A and/or the SIG-B fields on the remainder of the channels. As discussed further below, per baseline operation, a station may abandon further detection when a legacy preamble is not detected on the primary 20 MHz channel.

In baseline station receive processing, a station may perform legacy short training field (STF) and/or long training field (LTF) detection on the primary 20 MHz channel. When a legacy preamble is detected, the station may obtain signaling bits that indicate the bandwidth of the PPDU and the duration of the received PPDU. Alternatively, when a legacy preamble is not detected, the station may move to the next opportunity to perform legacy preamble-detection. Note that the station may adjust its bandwidth according to the indicated bandwidth, and may perform SIG-A and/or SIG-B field detection along with the relevant short training field and/or long training field.

In the proposed station receive processing for the first frame in an FFP, a station may perform legacy short training field and/or long training field detection on the primary 20 MHz channel. When a legacy preamble is detected, the station may follow the rest of the processing according to the baseline processing. Alternatively, when the legacy preamble is not detected on the primary 20 MHz channel, the station may widen its receive processing (e.g., as if the frame has the full bandwidth of the basic service set). The station may perform SIG-A field detection on each of the 20 MHz channels within the full bandwidth of the basic service set. When no SIG-A field is detected, the station may assume that the access point has not initiated transmission during the ongoing FFP, and the station may abandon receive processing on the remainder of the ongoing FFP. Moreover, when a SIG-A field is detected on one or more 20 MHz channels, the station may obtain the set of the 20 MHz channels (from the full bandwidth of the basic service set) and may perform the receive processing according to the indicated set of non-punctured channels for the ongoing PPDU, as well as for the rest of the PPDUs in the current FFP. The duration of the PPDU is often obtained from the legacy SIG. However, in order to enable the receive processing in the communication techniques, the receiver may need to obtain the PPDU duration in another way, e.g., for next-generation IEEE 802.11 electronic devices, by using an indication of the PPDU duration in the U-SIG or in the SIG-A field.

Figure 9:
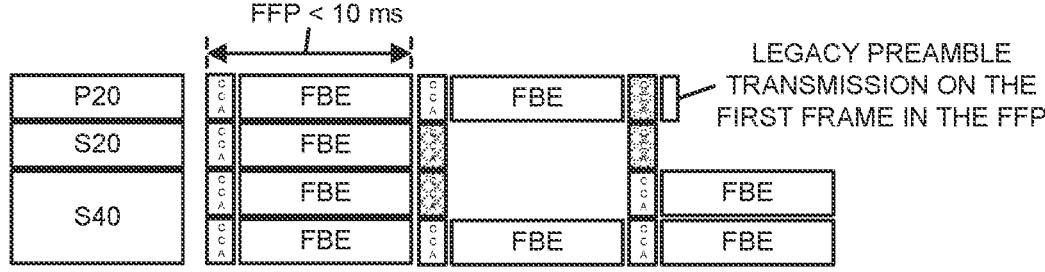
FIG. 9 is a drawing illustrating an example of wideband operation using one or more FBEs.

Additionally, as shown in FIG. 9, which presents a drawing illustrating an example of wideband operation using one or more FBEs, in some embodiments when CCA fails on the primary 20 MHz channel, the access point may still transmit the legacy preamble or a control frame on the primary 20 MHz channels and on the remaining 20 MHz channels whose CCA has not failed. For example, the legacy preamble (which includes the L-SIG field) may be transmitted as the first downlink frame in the FFP. Note that this operation may be allowed under ETSI BRAN regulatory short control signaling. The signaling bits carried in the legacy preamble (which may be embedded in scrambling bits) may indicate the punctured status of the primary 20 MHz channel (which may hold for the rest of the FFP). In addition to the legacy preamble, the U-SIG field may be transmitted, and signaling bits may be used to indicate the transmission status during the ongoing FFP with punctured primary channel(s). Moreover, in some embodiments, instead of a legacy preamble, a new signaling may be used instead. This new signaling may have similar structure as in a legacy preamble, but with new signaling bits that sufficiently describe the status of the primary channel (and each of the other 20 MHz channels) being punctured. Note that, when the primary 20 MHz channel fails CCA, the access point may still transmit on other (secondary) channels in an FFP.

Figure 10:
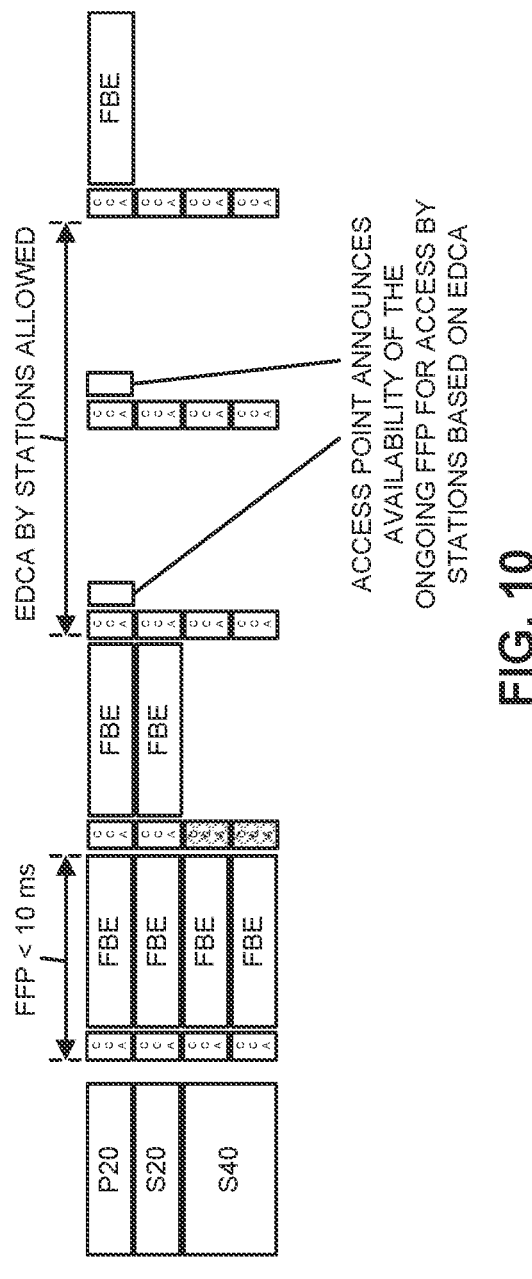
FIG. 10 is a drawing illustrating an example of communication using different channel access techniques.

As shown in FIG. 10, which presents a drawing illustrating an example of communication using different channel access techniques, when an access point establishes FBE within a basic service set, some FFPs may not be used or may only be partially used by the access point. The following describes techniques for how to use underutilized FFPs.

Notably, based at least in part on traffic demand that an access point observes, the access point may dynamically switch to an FBE mode. During operation in the FBE mode, the access point may predict an upcoming FFP to be underutilized or not used at all. For these FFP(s), the access point may allow station(s) to use the channel according to EDCA channel access rules. The access point may announce this in a first downlink frame that the access point transmits during the underutilized FFP. The announcement may indicate the set of 20 MHz channels or the bandwidth of operation during the FFP. Moreover, the access point may identify the station(s) that are allowed to perform EDCA during the ongoing FFPs. In some embodiments, the announcement may be transmitted in the primary 20 MHz channel (when the primary 20 MHz channel is not punctured).

Various signaling may be used to perform the preceding operations. For example, the access point may use a trigger frame to selectively pull station(s) and to provide an opportunity for the station(s) to send uplink trigger-based frames. Alternatively, a random-access trigger frame with new signaling bits may indicate the availability of the rest of the FFP (or multiple consecutive FFPs). In some embodiments, there may not be specific signaling from the access point to indicate availability of the (remainder of the) FFP for channel access using EDCA by the station(s). Instead, a station that intends to access the channel may do so after a duration or a time interval of the beginning of an FFP when the station does not detect any transmission from the access point.

Figure 11:
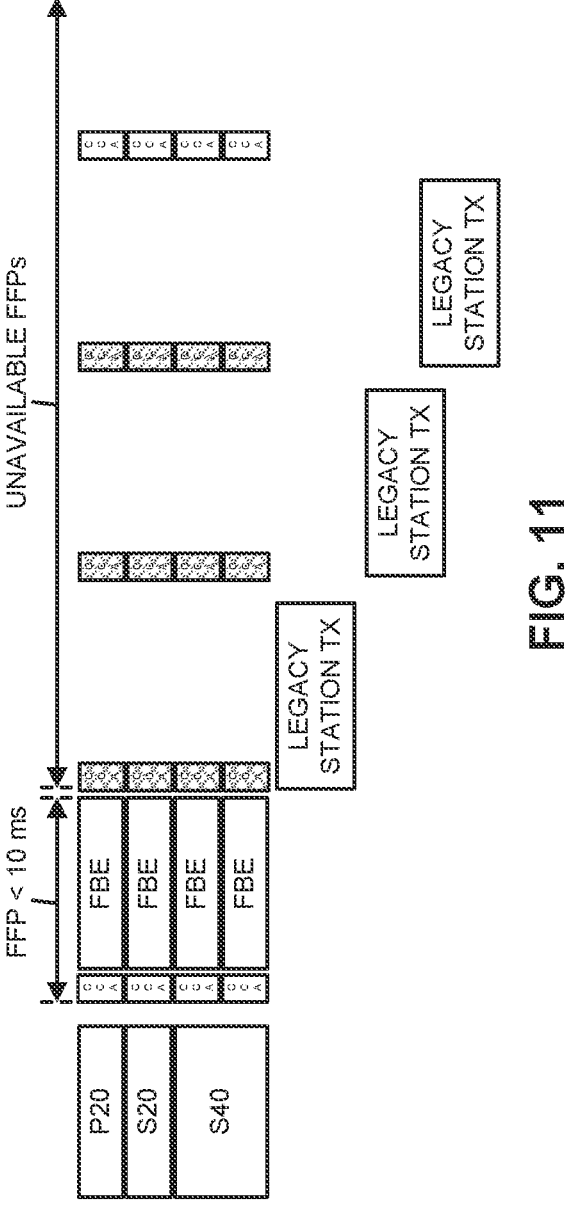
FIG. 11 is a drawing illustrating an example of communication using one or more FBEs in the presence of one or more legacy stations.

Moreover, as shown in FIG. 11, which presents a drawing illustrating an example of communication using one or more FBEs in the presence of one or more legacy stations, in an environment where legacy devices are present within the basic service set that is being administered by an access point with FBE capability, the uplink transmission by legacy devices can make one or many FFPs unavailable. This problem may be addressed by processing probe/association requests of the legacy station(s) within the same FFP, so that the access point can access the next FFP, and so that a legacy station follows the restrictions set by the access point (such as only using trigger-based access). Alternatively, the access point may use a channel switching procedure for the legacy stations and may force the legacy stations to switch to another band of frequencies (such as a basic service set transition or using a high efficiency sub-field in a media access control or MAC header). In some embodiments, when legacy devices are not associated with the same access point or basic service set, and the access point may find consecutive FFPs unavailable because of overlapping basic service set (OBSS) legacy device activities, the access point may abandon the current primary 20 MHz channel and may establish the basic service set using another 20 MHz channel as its primary channel. However, because of interference associated with legacy devices, the communication techniques may be more useful in a 6 GHz band of frequencies in which legacy devices do not operate.

Figure 12:
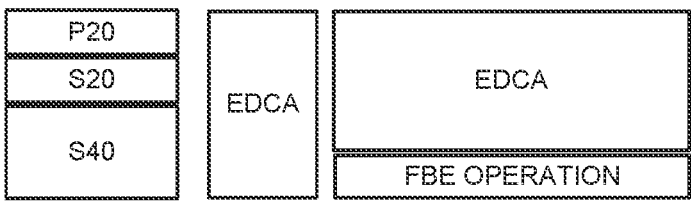
FIG. 12 is a drawing illustrating an example of communication using different channel access techniques.

Furthermore, as shown in FIG. 12, which presents a drawing illustrating an example of communication using different channel access techniques, an access point may adopt a mode of operation using EDCA and FBE with the following operations. Note that such operation may require simultaneous transmit/receive (STR) capability at access points. Consequently, this mixed mode of operation may be used for MLD access points with simultaneous transmit/receive-capable transmit/receive chains in the same band, e.g., a 5 GHz or a 6 GHz band of frequencies.

Based at least in part on traffic demand (e.g., low-latency traffic), the access point may switch to the FBE mode for a portion of the operational bandwidth. The access point may announce the FBE mode operation on a subset of the operational bandwidth in a new information element that is carried in beacon frames or another management frame. This new information element may include relevant attributes of the FBE mode, such as the FFP duration, the periodicity of the FBE operation, the expected duration of the FBE mode, etc.

Thus, the access point may perform EDCA channel access in a first subset of the bandwidth (which may include the primary 20 MHz channel). The access point may perform FBE channel access on the remainder (or a second subset) of the bandwidth.

As shown in the example in FIG. 12, EDCA channel access by the access point and a subset of associated stations may occur in a 20/40 MHz operation. Alternatively, 80 MHz PPDU transmission may occur with consistent punctured transmission in downlink and/or uplink. Such a mixed mode of operation may be announced in beacon frames for the duration that is ongoing (with associated attributes, such as the expected duration or start and/or end times of the FBE operation, the 20 MHz channels with FBE operation etc.). Note that the access point may selectively assign stations with specific traffic identifiers (or flows) to the portion or subset of the bandwidth with FBE operation.

Figure 13:
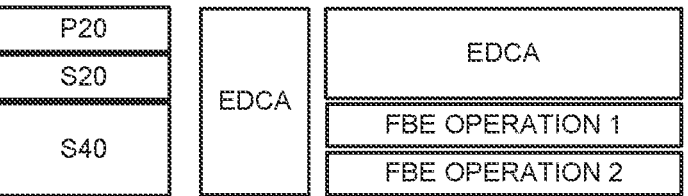
FIG. 13 is a drawing illustrating an example of communication using different channel access techniques.

Additionally, as shown in FIG. 13, which presents a drawing illustrating an example of communication using different channel access techniques, when an access point has multiple links with simultaneous transmit/receive capability on the same band of frequencies, the access point may adopt a mode of operation using EDCA and FBE on one or more 20 MHz channels, where more than one FBE mode is operated. For example, there may be one FBE mode with associated attributes in one 20 MHz channel, and a second FBE mode with associated (and possibly different) attributes in a second 20 MHz channel. Note that this capability may require an increased level of complexity at the access-point side, but not at the station side.

Thus, an access point may perform FBE channel access in multiple 20 MHz channels independently, e.g., with various attributes, various FFP starting times and varying FBE periodicity. The access point may adjust the FBE attributes on each of the 20 MHz channels, so that the overall channel access is optimized, e.g., in order to achieve reduced or the minimum channel access delay for specific traffic flow(s).

Based at least in part on traffic demand (e.g., low-latency traffic), the access point may switch to an FBE mode for a portion of the operational bandwidth, and depending on the traffic demand by a set of stations, more than one FBE modes may be operated (with the possibility of different attributes for some or all of the channels with FBE operation). The access point may announce each of operational bandwidth subsets with FBE operation attributes in an information element carried in beacon frames. The access point may perform EDCA channel access in a subset of the bandwidth (which may include the primary 20 MHz channel). The access point may perform FBE channel access on each subset of the remainder (or a subset of) the bandwidth. Note that when CCA fails in one FBE band or channel, the access point may transfer a station or traffic having a traffic identifier with low-latency traffic to another FBE band or channel.

In some embodiments, the communication techniques may be implemented in a physical layer and/or a MAC layer.

Note that the formats of packets or frames communicated during the communication techniques may include more or fewer bits, subfields or fields. Alternatively or additionally, the position of information in these packets or frames may be changed. Thus, the order of the subfields or fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots. In some embodiments, the communication techniques may use OFDMA.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE or another data communication protocol, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 14 presents a block diagram of an electronic device 1400 (which may be a cellular telephone, a smartwatch, an access point, a wireless speaker, an IoT device, another electronic device, etc.) in accordance with some embodiments. This electronic device includes processing subsystem 1410, memory subsystem 1412 and networking subsystem 1414. Processing subsystem 1410 includes one or more devices configured to perform computational operations. For example, processing subsystem 1410 can include one or more microprocessors, application-specific integrated circuits (ASICs), microcontrollers, graphics processing units (GPUs), programmable-logic devices, and/or one or more digital signal processors (DSPs).

Memory subsystem 1412 includes one or more devices for storing data and/or instructions for processing subsystem 1410, and/or networking subsystem 1414. For example, memory subsystem 1412 can include dynamic random access memory (DRAM), static random access memory (SRAM), a read-only memory (ROM), flash memory, and/or other types of memory. In some embodiments, instructions for processing subsystem 1410 in memory subsystem 1412 include: program instructions or sets of instructions (such as program instructions 1422 or operating system 1424), which may be executed by processing subsystem 1410. For example, a ROM can store programs, utilities or processes to be executed in a non-volatile manner, and DRAM can provide volatile data storage, and may store instructions related to the operation of electronic device 1400. Note that the one or more computer programs may constitute a computer-program mechanism, a computer-readable storage medium or software. Moreover, instructions in the various modules in memory subsystem 1412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1410. In some embodiments, the one or more computer programs are distributed over a network-coupled computer system so that the one or more computer programs are stored and executed in a distributed manner.

In addition, memory subsystem 1412 can include mechanisms for controlling access to the memory. In some embodiments, memory subsystem 1412 includes a memory hierarchy that includes one or more caches coupled to a memory in electronic device 1400. In some of these embodiments, one or more of the caches is located in processing subsystem 1410.

In some embodiments, memory subsystem 1412 is coupled to one or more high-capacity mass-storage devices (not shown). For example, memory subsystem 1412 can be coupled to a magnetic or optical drive, a solid-state drive, or another type of mass-storage device. In these embodiments, memory subsystem 1412 can be used by electronic device 1400 as fast-access storage for often-used data, while the mass-storage device is used to store less frequently used data.

Networking subsystem 1414 includes one or more devices configured to couple to and communicate on a wired and/or wireless network (i.e., to perform network operations), such as: control logic 1416, one or more interface circuits (or interface circuitry) 1418 and a set of antennas 1420 (or antenna elements) in an adaptive array that can be selectively turned on and/or off by control logic 1416 to create a variety of optional antenna patterns or 'beam patterns.'

Alternatively, instead of the set of antennas, in some embodiments electronic device 1400 includes one or more nodes 1408, e.g., a pad or a connector, which can be coupled to the set of antennas 1420. Thus, electronic device 1400 may or may not include the set of antennas 1420. For example, networking subsystem 1414 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 1414 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1400 may use the mechanisms in networking subsystem 1414 for performing simple wireless communication between the electronic devices, e.g., transmitting advertising or frame frames and/or scanning for advertising frames transmitted by other electronic devices.

Within electronic device 1400, processing subsystem 1410, memory subsystem 1412 and networking subsystem 1414 are coupled together using bus 1428 that facilitates data transfer between these components. Bus 1428 may include an electrical, optical, and/or electro-optical connection that the subsystems can use to communicate commands and data among one another. Although only one bus 1428 is shown for clarity, different embodiments can include a different number or configuration of electrical, optical, and/or electro-optical connections among the subsystems.

In some embodiments, electronic device 1400 includes a display subsystem 1426 for displaying information on a display, which may include a display driver and the display, such as a liquid-crystal display, a multi-touch touchscreen, etc. Display subsystem 1426 may be controlled by processing subsystem 1410 to display information to a user (e.g., information relating to incoming, outgoing, or an active communication session).

Moreover, electronic device 1400 can also include a user-input subsystem 1430 that allows a user of the electronic device 1400 to interact with electronic device 1400. For example, user-input subsystem 1430 can take a variety of forms, such as: a button, keypad, dial, touch screen, audio input interface, visual/image capture input interface, input in the form of sensor data, etc.

Electronic device 1400 can be (or can be included in) any electronic device with at least one network interface. For example, electronic device 1400 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1400, in alternative embodiments, different components and/or subsystems may be present in electronic device 1400. For example, electronic device 1400 may include one or more additional processing subsystems, memory subsystems, networking subsystems, and/or display subsystems. Additionally, one or more of the subsystems may not be present in electronic device 1400. Moreover, in some embodiments, electronic device 1400 may include one or more additional subsystems that are not shown in FIG. 14. In some embodiments, electronic device may include an analysis subsystem that performs at least some of the operations in the communication techniques. Also, although separate subsystems are shown in FIG. 14, in some embodiments some or all of a given subsystem or component can be integrated into one or more of the other subsystems or component(s) in electronic device 1400. For example, in some embodiments program instructions 1422 are included in operating system 1424 and/or control logic 1416 is included in the one or more interface circuits 1418.

Moreover, the circuits and components in electronic device 1400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1414. This integrated circuit may include hardware and/or software mechanisms that are used for transmitting wireless signals from electronic device 1400 and receiving signals at electronic device 1400 from other electronic devices. Aside from the mechanisms herein described, radios are generally known in the art and hence are not described in detail. In general, networking subsystem 1414 and/or the integrated circuit can include any number of radios. Note that the radios in multiple-radio embodiments function in a similar way to the described single-radio embodiments.

In some embodiments, networking subsystem 1414 and/ or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1422, operating system 1424 (such as a driver for an interface circuit in networking subsystem 1414) or in firmware in an interface circuit networking subsystem 1414. Alternatively or additionally, at least some of the operations in the communication techniques may be implemented in a physical layer, such as hardware in an interface circuit or interface circuitry in networking subsystem 1414. In some embodiments, the communication techniques are implemented, at least in part, in a MAC layer and/or in a physical layer in an interface circuit in networking subsystem 1414.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna node configured to communicatively couple to an antenna; and
an interface circuit, communicatively coupled to the antenna node, configured to communicate with a second electronic device, wherein the interface circuit is configured to:
provide, addressed to the second electronic device, a frame comprising an indication that the electronic device uses a frame-based equipment (FBE) channel access technique and attributes of the FBE channel access technique, wherein the attributes comprise a duration of the FBE channel access technique and a fixed frame period (FFP) for communication during the FBE channel access technique, and
wherein the frame is compatible with an Institute of Electrical and Electronics Engineers (IEEE) 802.11 standard;
predict an instance of the FFP will be underutilized; and
provide, addressed to the second electronic device, a second frame during the instance of the FFP indicating that the second electronic device can contend for a channel during the instance of the FFP using a contention-based channel access technique.

2. The electronic device of claim 1, wherein the interface circuit is configured to dynamically provide the frame based at least in part on a criterion associated with a type of traffic, the criterion comprising a latency requirement that is less than a threshold or a quality of service (QoS) requirement that is greater than a second threshold.

3. The electronic device of claim 1, wherein the frame comprises a beacon frame or another type of management frame.

4. The electronic device of claim 1, wherein, during an instance of the FFP, the interface circuit is configured to perform a clear channel assessment (CCA) for a time interval.

5. The electronic device of claim 4, wherein, when the CCA is successful, the interface circuit is configured to transmit a second frame addressed to the second electronic device during a remainder of the instance of the FFP.

6. The electronic device of claim 5, wherein, after transmitting the second frame, the interface circuit is configured to receive, associated with the second electronic device, an acknowledgment or a block acknowledgement during the remainder of the instance of the FFP.

7. The electronic device of claim 5, wherein transmitting the second frame comprises transmitting at least two second frames separated by an interframe space.

8. The electronic device of claim 4, wherein, when the CCA is successful, the interface circuit is configured to:

transmit, during a remainder of the instance of the FFP, a trigger frame addressed to the second electronic device; and
receive, after the trigger frame and associated with the second electronic device, a second frame during the remainder of the instance of the FFP.

9. The electronic device of claim 4, wherein, when the CCA is not successful, the interface circuit is configured to not transmit a second frame addressed to the second electronic device during a remainder of the instance of the FFP.

10. The electronic device of claim 4, wherein, when the CCA is successful, the interface circuit is configured to transmit, during an instance of the FFP, a beacon frame that indicates one or more intended recipients of one or more subsequent second frames to be transmitted during the instance of the FFP and the one or more intended recipients comprise the second electronic device.

11. The electronic device of claim 4, wherein the CCA is performed in channels in a band of frequencies during an instance of the FFP and the interface circuit is configured to communicate at least two second frames with the second electronic device using at least a subset of the channels where the CCA is successful.

12. The electronic device of claim 11, wherein the subset of the channels excludes a primary channel when the CCA is not successful in the primary channel.

13. The electronic device of claim 11, wherein, when the CCA is not successful in a primary channel, the interface circuit is configured to transmit a legacy preamble or short control signaling addressed to the second electronic device in the primary channel; and
wherein the legacy preamble or the short control signaling indicates the subset of the channels.

14. The electronic device of claim 11, wherein at least the two second frames indicate the subset of the channels.

15. The electronic device of claim 1, wherein the interface circuit is configured to:
provide, addressed to the second electronic device, a data frame having a field having the indication that the electronic device uses the FBE channel access technique and the attributes of the FBE channel access technique, and
wherein the data frame is compatible with the IEEE 802.11 standard.

16. The electronic device of claim 15, wherein the data frame indicates whether a first frame in an instance of the FFP comprises the field.

17. The electronic device of claim 1, wherein, when interference with a legacy device that is not compatible with the IEEE 802.11 standard occurs in a channel during an instance of the FFP, the interface circuit is configured to:
provide, addressed to the legacy device, a probe response or a management frame during the instance of the FFP, wherein the probe response is an unsolicited probe response, another management frame, or is in in response to a probe request associated with the legacy device that was received during the instance of the FFP, and the probe response or the other management frame comprises a restriction on transmission by the legacy device during the use of the FBE channel access technique;
provide, addressed to the legacy device, a recommendation to perform a basic service set transition to a second channel different from the channel; and
transition to a second link of the same basic service set that operates under other than FBE channel access; or change a primary channel used by the electronic device during the use of the FBE channel access technique.

18. A non-transitory computer-readable storage medium for use in conjunction with an electronic device, the computer-readable storage medium storing program instructions that, when executed by the electronic device, cause the electronic device to perform operations comprising:

providing, addressed to a second electronic device, a frame comprising an indication that the electronic device uses a frame-based equipment (FBE) channel access technique and attributes of the FBE channel access technique, wherein the attributes comprise a duration of the FBE channel access technique and a fixed frame period (FFP) for communication during the FBE channel access technique;

performing, during an instance of the FFP, a clear channel assessment (CCA) for a time interval;

predicting an instance of the FFP will be underutilized; and providing, addressed to the second electronic device, a second frame during the instance of the FFP indicating that the second electronic device can contend for a channel during the instance of the FFP using a contention-based channel access technique.

19. A method for providing a frame, comprising:

by an electronic device:

providing, addressed to a second electronic device, the frame comprising an indication that the electronic device uses a frame-based equipment (FBE) channel access technique and attributes of the FBE channel access technique, wherein the attributes comprise a duration of the FBE channel access technique and a fixed frame period (FFP) for communication during the FBE channel access technique;

performing, during an instance of the FFP, a clear channel assessment (CCA) for a time interval;

predicting an instance of the FFP will be underutilized; and providing, addressed to the second electronic device, a second frame during the instance of the FFP indicating that the second electronic device can contend for a channel during the instance of the FFP using a contention-based channel access technique.

20. The method of claim 19, wherein the electronic device is configured to dynamically provide the frame based at least in part on a criterion associated with a type of traffic, the criterion comprising a latency requirement that is less than a threshold or a quality of service (QoS) requirement that is greater than a second threshold.

\* \* \* \* \*